US007701965B2

(12) United States Patent
Ihori

(10) Patent No.: US 7,701,965 B2
(45) Date of Patent: Apr. 20, 2010

(54) COMMUNICATION DEVICE, COMMUNICATION METHOD AND PROGRAM

(75) Inventor: Akihiro Ihori, Kanagawa (JP)

(73) Assignee: Sony Corporation, Tokyo (JP)

( * ) Notice: Subject to any disclaimer, the term of this patent is extended or adjusted under 35 U.S.C. 154(b) by 209 days.

(21) Appl. No.: 11/835,622

(22) Filed: Aug. 8, 2007

(65) Prior Publication Data
US 2008/0043773 A1     Feb. 21, 2008

(30) Foreign Application Priority Data
Aug. 16, 2006   (JP)   ............................. 2006-222096

(51) Int. Cl.
*H04J 3/22*  (2006.01)
(52) U.S. Cl. ...................... 370/464; 370/465
(58) Field of Classification Search ................ 370/465, 370/460, 240, 352; 375/240
See application file for complete search history.

(56) References Cited

U.S. PATENT DOCUMENTS

| 4,908,823 | A  | * | 3/1990  | Haagens et al. ............. 370/464 |
| 5,197,065 | A  | * | 3/1993  | Calvignac et al. ........... 370/378 |
| 5,228,030 | A  | * | 7/1993  | Dresher ...................... 370/464 |
| 7,103,025 | B1 | * | 9/2006  | Choksi ........................ 370/335 |
| 7,418,240 | B2 | * | 8/2008  | Hsu et al. ................. 455/67.13 |
| 7,486,628 | B1 | * | 2/2009  | Brisebois et al. ............ 370/260 |
| 2002/0105968 | A1 | * | 8/2002  | Pruzan et al. ............... 370/465 |
| 2003/0123477 | A1 | * | 7/2003  | Gollamudi et al. .......... 370/465 |
| 2003/0161323 | A1 | * | 8/2003  | Harada et al. .......... 370/395.21 |
| 2004/0028011 | A1 | * | 2/2004  | Gehring et al. ............. 370/330 |
| 2004/0063406 | A1 | * | 4/2004  | Petrus et al. ............. 455/67.11 |
| 2004/0156388 | A1 | * | 8/2004  | Bush .......................... 370/465 |
| 2004/0264497 | A1 | * | 12/2004 | Wang et al. ................. 370/465 |
| 2005/0025040 | A1 | * | 2/2005  | Tang et al. .................. 370/208 |
| 2005/0122912 | A1 | * | 6/2005  | Jeon et al. ................... 370/252 |
| 2005/0227698 | A1 | * | 10/2005 | Nonin et al. ............. 455/452.2 |
| 2005/0286410 | A1 | * | 12/2005 | Truong et al. ............... 370/216 |
| 2006/0029139 | A1 | * | 2/2006  | Teichner et al. ........ 375/240.28 |
| 2006/0120319 | A1 | * | 6/2006  | Omori et al. ................ 370/328 |
| 2006/0209884 | A1 | * | 9/2006  | MacMullan et al. ......... 370/465 |
| 2006/0215689 | A1 | * | 9/2006  | Liu et al. .................... 370/465 |

(Continued)

FOREIGN PATENT DOCUMENTS

| JP | 2003-259447 | 9/2003 |
| JP | 3774464     | 2/2006 |

*Primary Examiner*—Chi H Pham
*Assistant Examiner*—Robert Lopata
(74) *Attorney, Agent, or Firm*—Finnegan, Henderson, Farabow, Garrett and Dunner, L.L.P.

(57) ABSTRACT

The communication device according to the present invention includes a communication condition detection unit that detects communication conditions with regard to communication with other communication devices, a link adaptation decision-making unit that makes a decision as to whether or not link adaptation needs to be executed in correspondence to the communication conditions, a link adaptation parameter selection unit that selects a link adaptation parameter to be used for the link adaptation when the link adaptation is judged to be necessary, a transfer rate decision-making unit that makes an advance decision as to whether or not the data transfer rate is to become, lower compared to the pre-link adaptation state if the link adaptation is executed based upon the selected link adaptation parameter and a link adaptation unit that executes the link adaptation based upon the selected link adaptation parameter if the data transfer rate is judged not to become lower.

8 Claims, 6 Drawing Sheets

U.S. PATENT DOCUMENTS

| | | | |
|---|---|---|---|
| 2006/0274783 A1* | 12/2006 | Terry et al. | 370/465 |
| 2006/0291500 A1* | 12/2006 | Kroninger et al. | 370/465 |
| 2007/0025391 A1* | 2/2007 | Yonge et al. | 370/458 |
| 2007/0116038 A1* | 5/2007 | Holt et al. | 370/465 |
| 2007/0171936 A1* | 7/2007 | Hazra et al. | 370/465 |
| 2007/0171937 A1* | 7/2007 | Boatright et al. | 370/465 |
| 2007/0223374 A1* | 9/2007 | Popovski et al. | 370/230 |
| 2007/0258395 A1* | 11/2007 | Jollota et al. | 370/310 |
| 2009/0059903 A1* | 3/2009 | Kubler et al. | 370/352 |
| 2009/0073928 A1* | 3/2009 | Power et al. | 370/329 |

* cited by examiner

| PIPE | NUMBER OF MAS ALLOCATIONS | LINK ADAPTATION PARAMETERS ||| PARTNER DEVICE | OPERATING CONDITIONS |
| --- | --- | --- | --- | --- | --- | --- |
| | | PHY RATE | PACKET SIZE | TRANSMISSION POWER LEVEL | | |
| CONTROLLED TRANSFER | — | 53 | 512 | 7 | A | ○ |
| CONTROLLED TRANSFER | — | 53 | 512 | 7 | B | ○ |
| BULK TRANSFER | — | 400 | 2048 | 4 | A | × |
| ISOCHRONOUS TRANSFER | 20 | 200 | 1024 | 5 | B | ○ |

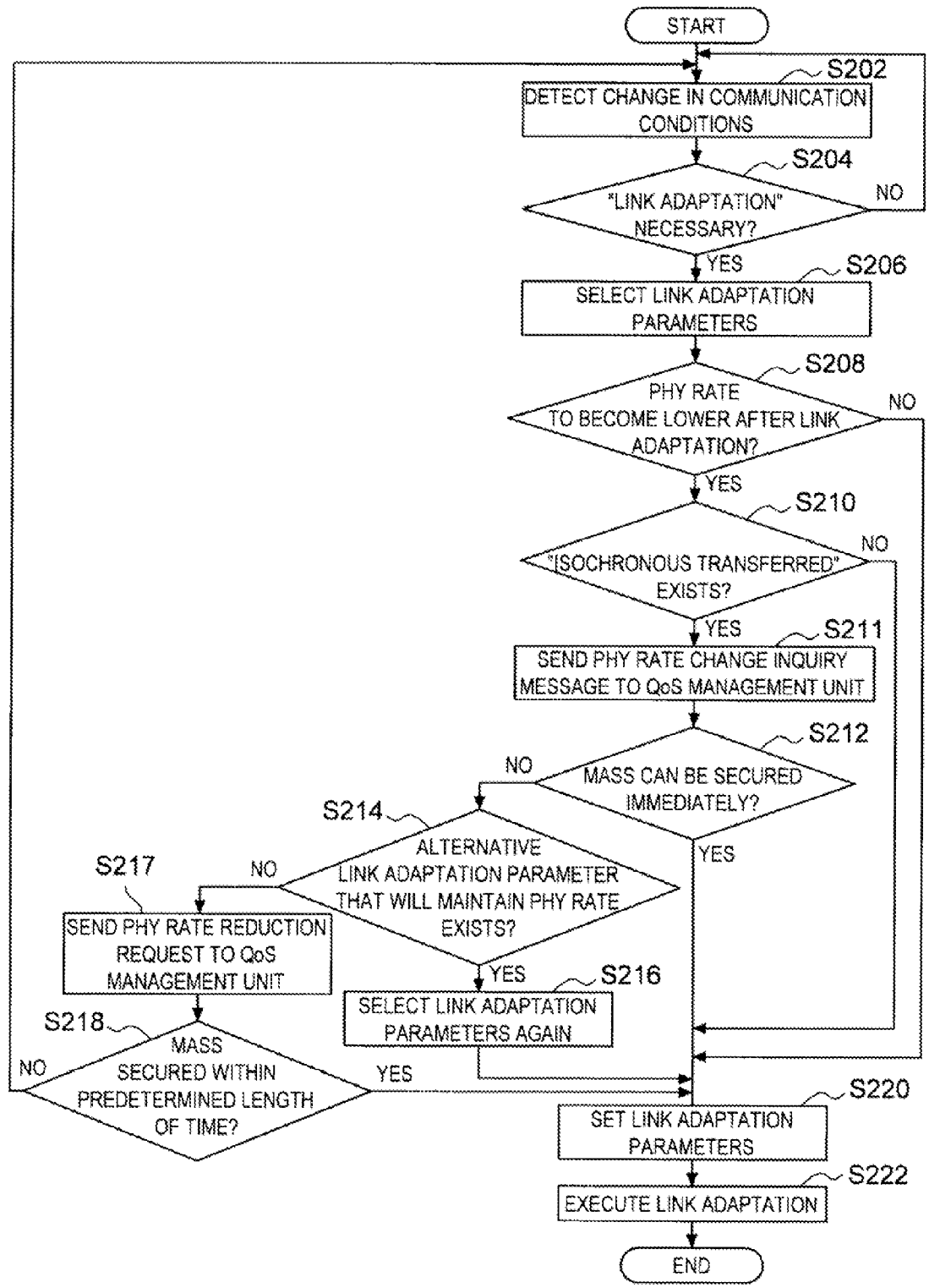

COMMUNICATION DEVICE, COMMUNICATION METHOD AND PROGRAM

CROSS REFERENCES TO RELATED APPLICATIONS

The present invention contains subject matter related to Japanese Patent Application JP 2006-222096 filed in the Japan Patent Office on Aug. 16, 2006, the entire contents of which are incorporated herein by reference.

BACKGROUND OF THE INVENTION

1. Field of the Invention

The present invention relates to a communication device, a communication method and a program.

2. Description of the Related Art

The "link adaptation" technologies have come to be recognized in recent years in the area of wireless communication as effective means for improving the communication state by controlling the communication method in correspondence to the communication conditions under which a plurality of communication devices communicate with one another. A given communication device may execute link adaptation by adjusting the transfer rate (PHY rate) for a physical layer, the packet size, the modulation method or the transmission power as the communication environment becomes poor and the error rate increases. By executing such link adaptation, the communication device is able to improve the communication environment, including an improvement in the throughput and a reduction in power consumption.

For instance, Japanese Patent Publication No. 3,774,464 teaches an art related to a wireless communication system that includes a wireless terminal and a base station apparatus able to communicate with each other through a time-division multiple access technology. Moreover, the publication discloses a technology, for improving the communication quality by adjusting the slot length. The base station apparatus in the wireless communication system reduces the PHY rate and increases the time slots allocated to the transfer data as the communication conditions become poor, so as to sustain the communication quality at a desired level.

SUMMARY OF THE INVENTION

However, the base station apparatus adopting the method disclosed in the publication will execute link adaptation even when the desired time slots are difficult to be secured, which may result in a condition under which the PHY rate is lowered. Under such circumstances, the quality of post-link adaptation communication will remain poorer than the communication quality prior to the link adaptation, until the desired time slots are secured. For this reason, the link adaptation method, which may greatly, compromise communication quality either temporarily or intermittently, is difficult to be readily adopted in a communication mode in which assurance of high quality communication is important.

Accordingly, the present invention provides a new and improved communication device, a new and improved communication method and a new and improved program, with which any reduction in the communication quality attributable to link adaptation can be preempted.

According to an embodiment, of the present invention, there is provided a communication device capable of transferring time-division data and also capable of executing link adaptation for adjusting a communication method in correspondence to communication conditions with regard to communication with other communication devices.

The communication device includes a communication condition detection unit that detects the communication conditions, a link adaptation decision-making unit that makes a decision as to whether or not the link adaptation needs to be executed based upon the communication conditions, a link adaptation parameter selection unit that selects a link adaptation parameter to be used for the link adaptation if the link adaptation is judged to be necessary, a storage unit that holds a communication management table containing setting information with regard to at least a data transfer rate to be used as a link adaptation parameter at transfer rate decision-making unit that makes an advance decision by referencing a pre-link adaptation data transfer rate recorded in the communication management table as to whether or not the data transfer rate is to become lower compared to the pre-link adaptation state if the link adaptation is executed based upon the selected link adaptation parameter, a transfer lode decision-making unit that makes a decision prior to execution of the link adaptation as to whether or not a currently selected data transfer mode includes a quality assurance mode in which communication quality needs to be assured, a communication quality management unit that allocates a large enough number of time slots to sustain the communication quality to transfer data if the data transfer mode is judged to include the quality assurance mode and the data transfer rate is judged to become lower after the execution of the link adaptation, a communication management table update unit that updates the communication management table based upon the selected link adaptation parameter if the data transfer rate is judged not to become lower after the execution of the link adaptation or the communication quality management unit adjusts the number of time slots allocated to the transfer data and a link adaptation unit that executes the link adaptation based upon the link adaptation parameter having been recorded in the communication management table.

The communication condition detection unit detects the communication conditions. The link adaptation decision-making unit makes a decision as to whether or not the link adaptation needs to be executed based upon the communication conditions. If the link adaptation is judged to be necessary, the link adaptation parameter selection unit selects a link adaptation parameter to be used in the link adaptation. The storage unit holds a communication management table containing setting information on the data transfer rate to be used as a link adaptation parameter. The transfer rate decision-making unit makes an advance decision by referencing a pre-link adaptation data transfer rate recorded in the communication management table as to whether or not the data transfer rate is to become lower compared to the pre-link adaptation state if the link adaptation is executed based upon the selected link adaptation parameter. The transfer mode decision-making unit makes a decision prior to execution of the link adaptation as to whether or not the currently selected data transfer mode includes a quality assurance mode in which communication quality needs to be assured. The communication quality management unit allocates a large enough number of time slots to sustain the communication quality to transfer data if the data transfer mode is judged to include the quality assurance mode and the data transfer rate is judged to become lower after the execution of the link adaptation. The communication management table update unit updates the communication management table based upon the selected link adaptation parameter if the data transfer rate is judged not to become lower after the execution of the link adaptation or the communication quality management unit adjusts the number of time slots allocated to the transfer data. The link adaptation unit executes the link adaptation based upon the link adaptation parameter having been recorded in the communication management table.

As described above, the communication device is able to make an advance decision prior to the execution of the link adaptation is to whether or not the data transfer rate is to become lower due to the link adaptation. In addition, if the data transfer rate is judged to become lower, the communication device is able to secure in advance the necessary number of time slots. If the desired time slots are difficult to be secured in advance, the communication device is able to suspend the link adaptation so as to ensure that the communication quality, is not compromised due to the link adaptation in a transfer mode in which the assurance of communication quality is important.

According to another embodiment of the present invention, there is provided a communication device capable of executing link adaptation in correspondence to communication conditions with regard to communication with other communication devices.

The communication device includes a communication condition detection unit that detects the communication conditions with regard to communication with the other communication devices, a link adaptation decision-making unit that makes a decision as to whether or not the link adaptation needs to be executed based upon the communication conditions, a link adaptation parameter selection unit that selects a link adaptation parameter to be used for the link adaptation if the link adaptation is judged to be necessary, a transfer rate decision-making unit that makes an advance decision as to whether or not a data transfer rate is to become lower compared to a pre-link adaptation state if the link adaptation is executed based upon the selected link adaptation parameter, a transfer mode decision-making unit that makes a decision prior to execution of the link adaptation as to whether or not currently selected data transfer modes include a quality assurance mode in which communication quality needs to be assured and a link adaptation unit that executes the link adaptation by using the selected link adaptation parameter if the currently selected data transfer modes are judged to include the quality assurance mode and the data transfer rate is judged not to become lower.

The communication condition detection unit detects the communication conditions with regard to communication with other communication devices. The link adaptation decision-making unit makes a decision as to whether or not the link adaptation needs to be executed based upon the communication conditions. The link adaptation parameter selection unit selects a link adaptation parameter to be used for the link adaptation if the link adaptation is judged to be necessary. The transfer rate decision-making unit that makes an advance decision as to whether or not the data transfer rate is to become lower compared to the pre-link adaptation state if the link adaptation is executed based upon the selected link adaptation parameter. The transfer mode decision-making unit makes a decision prior to execution of the link adaptation as to whether or not currently selected data transfer modes include a quality assurance mode in which communication quality needs to be assured. The link adaptation unit executes the link adaptation by using the selected link adaptation parameter if the currently selected data transfer modes are judged to include the quality assurance mode and the data transfer rates is judged not to become lower.

As described above, the communication device is capable of making an advance decision prior to the execution of the link adaptation as to whether or not the data transfer rate is to become lower due to the link adaptation. If it is decided that the data transfer rate is to become lower, the communication device suspends the link adaptation. Thus, the communication device is able to preempt any reduction in the communication quality that may otherwise occur due to the link adaptation.

The communication device further includes a storage unit having recorded therein a communication management table containing setting information based upon which at least a data transfer rate to be used as a link adaptation parameter is set and a communication management table update unit that updates the link adaptation parameters contained in the communication management table.

The transfer rate decision-making unit in this communication device makes a decision by referencing the data transfer rate set in a pre-link adaptation state, which is recorded in the communication management table, as to whether or not the data transfer rate is to become lower after the execution of the link adaptation. The storage unit having recorded therein the communication management table records the selected link adaptation parameter into the communication management table if the data transfer rate is judged not to become lower after the execution of the link adaptation. The link adaptation unit then executes the link adaptation based upon the link adaptation parameter having been recorded in the communication management table.

The communication management table in the storage unit included in the communication device may contain the setting information based upon which at least a data transfer rate to be used as a link adaptation para meter is set. In addition, the communication management table update unit may update the link adaptation parameter contained in the communication management table. As described above, the communication device makes an advance decision prior to the execution of the link adaptation as to whether or not the data transfer rate is to become lower due to the link adaptation by referencing the link adaptation parameters recorded in the communication management table, which includes the, data transfer rate and the like set in the pre-link adaptation state. If the data transfer rate is judged to become lower, the communication device is able to preempt any reduction in the communication quality attributable to the link adaptation by suspending the execution of the link adaptation.

According to another embodiment of the present invention, there is provided a communication device capable of transferring time-division data and also capable of executing link adaptation for adjusting a communication method in correspondence to communication conditions with regard to communication with other communication devices.

The communication device includes a communication condition detection unit that detects the communication conditions, a link adaptation decision-making unit that makes a decision as to whether or not the link adaptation needs to be executed based upon the communication conditions, a link adaptation parameter selection unit that selects a link adaptation parameter to be used for the link adaptation if the link adaptation is judged to be necessary, a storage unit that holds a communication management table containing setting information with regard to at least a data transfer rate to be used as a link adaptation parameter, a transfer mode decision-making unit that makes a decision prior to execution of the link adaptation as to whether or not currently selected data transfer modes include a quality assurance mode, in which communication quality should be assured and a link adaptation unit that executes the link adaptation based upon the selected link adaptation parameter if the currently selected data transfer modes do not include the quality assurance mode.

The communication condition detection unit detects the communication conditions. The link adaptation decision-making unit makes a decision as to whether or not the link adaptation needs to be executed based upon the communication conditions. The link adaptation parameter selection unit selects a link adaptation parameter to be used for the link adaptation if the link adaptation is judged to be necessary. The storage unit holds a communication management table containing setting information with regard to at least a data transfer rate to be used as a link adaptation parameter. The transfer mode decision-making unit makes a decision prior to execution of the link adaptation as to whether or not currently selected data transfer modes include the quality assurance mode, in which communication quality is assured. The link adaptation unit executes the link adaptation based upon the selected link adaptation parameter if the currently selected data transfer modes do not include the quality assurance mode. As described above, the communication device references the communication management table when making a decision as to whether or not the quality assurance mode is selected prior to the execution of the link adaptation. If the quality assurance mode is selected, the communication device does not execute the link adaptation so as to preempt any reduction in the communication quality attributable to the link adaptation.

According to another embodiment of the present invention, there is provided a communication device capable of transferring data by adopting a time-division data transfer method and also capable of executing link adaptation for adjusting a communication method in correspondence to communication conditions with regard to communication with other communication devices.

The communication device includes a communication condition detection unit that detects the communication conditions, a link adaptation decision-making unit that makes a decision as to whether or not the link adaptation needs to be executed based upon the communication conditions, a link adaptation parameter selection unit that selects a link adaptation parameter to be used for the link adaptation if the link adaptation is judged to be necessary, a transfer rate decision-making unit that makes an advance decision as to whether or not a data transfer rate is to become lower compared to the pre-link adaptation state if the link adaptation is executed based upon the selected link adaptation parameter, a transfer mode decision-making unit that makes a decision prior to execution of the link adaptation as to whether or not a currently selected data transfer mode includes a quality assurance mode in which communication quality needs to be assured, a communication quality management unit that allocates a large enough number of time slots to sustain the communication quality to transfer data if the data transfer mode is judged to include the quality assurance mode and the data transfer rate is judged to become lower after the execution of the link adaptation and a link adaptation unit that executes the link adaptation by using the selected link adaptation parameter after the number of allocated time slots is adjusted.

The communication condition detection unit detects the communication conditions. The link adaptation decision making unit makes a decision as to whether or not the link adaptation needs to be executed based upon the communication conditions. The link adaptation parameter selection unit selects a link adaptation parameter to be used for the link adaptation if the link adaptation is judged to be necessary. The transfer rate decision-making unit makes an advance decision as to whether or not a data transfer rate is to become lower compared to the pre-link adaptation state if the link adapta-tion is executed based upon the selected link adaptation parameter. The transfer mode decision-making unit makes a decision prior to execution of the link adaptation as to whether or not a currently selected data transfer mode includes a quality assurance mode in which communication quality needs to be assured. The communication quality management unit allocates a large enough number of time slots to sustain the communication quality to transfer data if the data transfer mode is judged to include the quality assurance mode and the data transfer rate is judged to become lower after the execution of the link adaptation. The link adaptation unit executes the link adaptation by using the selected link adaptation parameter after the number of allocated time slots is adjusted.

As described above the communication device is able to make an advance decision prior to the execution of the link adaptation as to whether or not the data transfer rate is to become lower due to the link adaptation. Thus, if the data transfer rate is judged to become lower, the communication device is able to secure in advance the necessary number of time slots. If the required number of time slots are difficult to be secured in advance, the communication device is able to suspend the link adaptation so as to ensure that the communication quality is not compromised due to the link adaptation in a transfer mode in which the assurance of communication duality is crucial.

According to another embodiment of the present invention, there is provided a communication method that enables data transfer based upon a time-division data transfer system and also enables execution of link adaptation for adjusting a communication method in correspondence to communication conditions with regard to communication with other communication devices.

The communication method includes a communication condition detection step for detecting the communication conditions, a link adaptation decision-making step for making a decision based upon the communication conditions as to whether or not the link adaptation needs to be executed, a link adaptation parameter selection step for selecting a link adaptation parameter to be used for the link adaptation when the link adaptation is judged to be necessary, a transfer rate decision-making step for making an advance decision by referencing a communication management table having recorded therein a pre-link adaptation data transfer rate as to whether or not the data transfer rate is to become lower compared to the pre-link adaptation state if the link adaptation is executed based upon the selected link adaptation parameter, a transfer mode decision-making step for making a decision prior to execution of the link adaptation as to whether or not a currently selected data transfer mode includes a quality assurance mode in which communication quality should be assured, a communication quality management step for allocating a number of time slots large enough to maintain the communication quality to transfer data if the currently selected data transfer mode is judged to include the quality assurance mode and the data transfer rate is judged to become lower after the execution of the link adaptation, a communication management table update step for updating the communication management table based upon the selected link adaptation parameter if the data transfer rate is judged not to become lower after the execution of the link adaptation or if the number of time slots allocated to the transfer data is adjusted in the communication quality management step, and a link adaptation step for executing the link adaptation based upon the link adaptation parameter having been recorded in the communication management table.

In the communication condition detection step, the communication conditions are detected. In the link adaptation decision-making step, a decision as to whether or not the link adaptation needs to be executed is made based upon the communication conditions. In the link adaptation parameter selection step, a link adaptation parameter to be used for the link adaptation is selected if the link adaptation is judged to be necessary. In the transfer rate decision-making step, an advance decision is made by referencing the communication management table having recorded therein the pre-link adaptation data transfer rate as to whether or not the data transfer rate is to become lower compared to the pre-link adaptation state if the link adaptation is executed based upon the selected link adaptation parameter. In the transfer mode decision-making step, a decision is made before executing the link adaptation as to whether or not the currently selected data transfer mode includes a quality assurance mode in which the communication quality should be assured. In the communication quality, management step, the number of time slots large enough to maintain communication quality is allocated to the transfer data if the currently selected data transfer mode is judged to include the quality assurance mode and the data transfer rate is judged to become lower alter the execution of the link adaptation. In the communication management table update step, the communication management table is updated based upon the selected link adaptation parameter if the data transfer rate is judged not to become lower after executing the link adaptation or if the number of time slots allocated to the transfer data is adjusted in the communication quality management step. In the link adaptation step, the link adaptation is executed based upon the link adaptation parameter having been recorded in the communication management table.

The communication method described above includes a step of making an advance decision prior to the link adaptation as to whether or not the data transfer rate is to become lower due to the link adaptation. Thus, if the data transfer rate is judged to become lower, the communication device is able to secure in advance the necessary number of time slots. If the desired number of time slots are difficult to be secured in advance, the communication device is able to suspend the link adaptation so as to ensure that the communication quality is not compromised due to the link adaptation in a transfer mode in which the assurance of communication quality is crucial.

A communication device capable of transferring time-division data and also capable of executing link adaptation for adjusting a communication method in correspondence to communication conditions with regard to communication with other communication devices, includes a communication condition detection unit that detects the communication conditions, a link adaptation decision-making unit that makes a decision as to whether or not the link adaptation needs to be executed based upon the communication conditions, a link adaptation parameter selection unit that selects a link adaptation parameter to be used for the link adaptation if the link adaptation is judged to be necessary, a transfer mode decision-making unit that makes a decision prior to execution of the link adaptation as to whether or not a currently selected data transfer mode includes a quality assurance mode in which communication quality needs to be assured, a communication quality management unit that allocates a large enough number of time slots to sustain the communication quality to transfer data if the data transfer mode is judged to include the quality assurance mode and a link adaptation unit that executes the link adaptation by using the selected link adaptation parameter after the number of allocated time slots has been changed.

According to another embodiment of the present invention, there is provided a program that enables a computer to achieve communication functions with which data car be transferred by adopting a time-division data transfer method and link adaptation for adjusting a communication method in correspondence to communication conditions with regard to communication with other communication devices can be executed.

The program enables the computer to achieve a communication condition detection function for detecting the communication conditions, a link adaptation decision-making function for making a decision based upon the communication conditions as to whether or not the link adaptation needs to be executed, a link adaptation parameter selection function for selecting a link adaptation parameter to be used for the link adaptation when the link adaptation is judged to be necessary, a transfer rate decision-making function for making an advance decision by referencing communication management table having recorded therein a pre-link adaptation data transfer rate as to whether or not the data transfer rate is to become lower compared to the pre-link adaptation state if the link adaptation is executed based upon the selected link adaptation parameter, a transfer mode decision-making function for making a decision prior to execution of the link adaptation as to whether or not a currently selected data transfer mode includes a quality assurance mode in which communication quality should be assured, a communication quality management function for allocating a number of time slots large enough to maintain the communication quality to transfer data if the currently selected data transfer mode includes the quality assurance mode and the data transfer rate is judged to become lower alter the execution of the link adaptation, a communication management table update function for updating the communication management table based upon the selected link adaptation parameter if the data transfer rate is judged not to become lower after the execution of the link adaptation or if the number of time slots allocated to the transfer data is adjusted through the communication quality management function, and a link adaptation function for executing the link adaptation based upon the link adaptation parameter having been recorded in the communication management table.

Through the communication condition detection function, the communication conditions are detected. Through the link adaptation decision-making function, a decision as to whether or not the link adaptation needs to be executed is made based upon the communication conditions. Through the link adaptation parameter selection function, a link adaptation parameter to be used for the link adaptation is selected if the link adaptation is judged to be necessary. Through the transfer rate decision-making function, an advance decision is made by referencing the communication management table having recorded therein the pre-link adaptation data transfer rate as to whether or not the data transfer rate is to become lower compared to the pre-link adaptation state if the link adaptation is executed based upon the selected link adaptation parameter. Through the transfer mode decision-making function, a decision is made before executing the link adaptation as to whether or not the currently selected data transfer mode is judged to include a quality assurance mode in which the communication quality should be assured. Through the communication quality management function a number of time slots large enough to maintain communication quality is allocated to the transfer data if the currently selected data transfer mode is judged to include the quality assurance mode and the data transfer rate is judged to become lower after the execution of the link adaptation. Through the communication management table update function, the communication management table is updated based upon the selected link adaptation parameter if the data transfer rate is judged not to become lower after executing the link adaptation or if the number of time slots allocated to the transfer data is adjusted through the communication quality management function. Through the link adaptation function, the link adaptation is executed based upon the link adaptation parameter having been recorded in the communication management table.

Based upon the program described above, an advance decision is made prior to the execution of the link adaptation to whether or not the data transfer rate is to become lower due to the link adaptation. Thus, the program makes it possible to secure in advance the necessary number of time slots even when the data transfer rate is to become lower. In addition, even when the required number of time slots are difficult to be secured in advance, the program ensures that the communication quality does not become compromised due to the link adaptation in a transfer mode in which the communication quality should be assured by suspending the link adaptation.

According to the embodiment of the present invention described above, reduction in the communication quality attributable to the link adaptation can be preempted.

BRIEF DESCRIPTION OF THE DRAWINGS

FIG. 4 shows the data structure adopted in the data in the communication management table in the embodiment;

FIG. 7 presents a flowchart of the link adaptation processing executed in the embodiment.

DETAILED DESCRIPTION OF THE PREFERRED EMBODIMENTS

Figure 1:
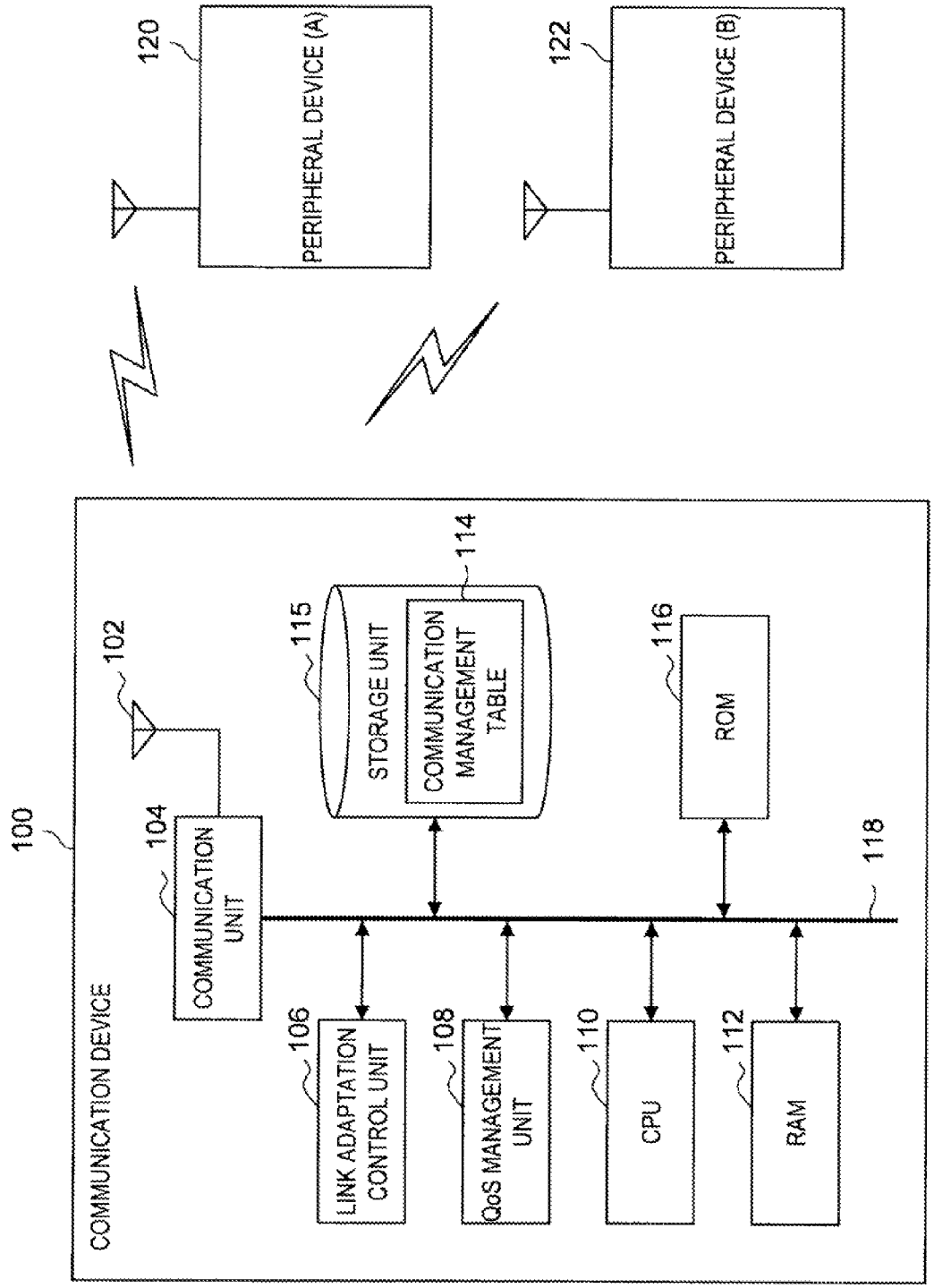
FIG. 1 is a block diagram showing the structure of the communication device achieved in an embodiment of the present invention.

Hereinafter, preferred embodiments of the present invention will be described in detail with reference the appended drawings. Note that, in this specification and the appended drawings, structural elements that have substantially the same function and structure are denoted with the same reference numerals, and repeated explanation of these structural elements is omitted.

(Link Adaptation)

Before the preferred embodiment of the present invention is explained the concept of "link adaptation" is briefly described A contemporary wireless communication system may have a function of adjusting the transfer rate (PHY rate) at a physical layer, the packet size, the transmission power, the modulation method and the like so as to assure optimal communication state even as communication conditions change. By adopting this technology referred to as "link adaptation", an improvement in the throughput, a reduction in power consumption and the like may be achieved.

Examples of such link adaptation include a modulation technology referred to as adaptive modulation or adaptive sub-carrier modulation executed in the OFDM (orthogonal frequency division multiplexing) system widely adopted in wireless LAN (local area network applications. By adopting such a modulation technology, a communication device is able to adaptively adjust parameters such as the modulation method, the PHY rate and the transmission power based upon the transmission error rate determined in correspondence to each carrier wave.

The parameters to be adaptively adjusted need to be selected under a specific restricting condition. Such a restricting condition may be, for instance, "the highest possible transmission speed is achieved at a given constant transmission power level while assuring a specified bit error rate", "the transmission power is minimized while a specific bit error rate and a specific transmission speed are assured" or the like. In addition, when the communication conditions are poor, a mode with a high level of error tolerance should be selected by lowering the transmission speed. When the communication conditions are good, on the other hand, a mode assuring a high transfer rate should be selected at the expense of high error tolerance. In short, as long as it is not necessary to assure a specific level of performance with regard to throughput, delays and the like, link adaptation may be executed in any manner to provide favorable results.

The settings need to be adjusted by factoring in, in advance, the communication conditions before and after the execution of the link adaptation in a communication environment in which a specific level of communication quality (QoS; quality of service) needs to be maintained. It may sometimes be necessary to forgo execution of the link adaptation if the execution of the link adaptation would result in poorer communication conditions. The technology achieved in an embodiment of the present invention is expected to bring about a favorable effect when adopted in a communication environment where assurance of a specific level of communication quality is important.

Communication modes in which the communication quality should be assured include an isochronous transfer mode defined in conformance to the WUSB (wireless universal serial bus) standard. The following explanation is provided on an example in which the present invention is adopted in conjunction with the isochronous transfer mode. However, it goes without saying that the application range over which the technology according to the present invention may be adopted is not limited to this example and it may also be successfully adopted in any of various types of wireless or wired communication means including a wireless LAN, Bluetooth (registered trademark) and wireless 1394.

(Transfer Modes Defined in the WUSB Standard)

The transfer modes defined in conformance to the WUSB standard are briefly explained. The WUSB standard covers transfer modes provided in conformance to the USB (universal serial bus) standard, and it defines four transfer modes, i.e., "controlled transfer", "bulk transfer", "interrupt transfer" and the "isochronous transfer" mentioned above, as indicated in table 1.

The controlled transfer mode is selected when setting up other communication devices or transferring setting parameters. The bulk transfer mode is selected when transferring a large volume of data at high speed. Accordingly, the bulk transfer mode is selected when a relatively large volume of data, typically input from a storage device, a scanner, a printer or the like, is transferred. In addition, assurance of a high transfer speed is not required in the bulk transfer mode. The interrupt transfer mode is selected when transferring a relatively small volume of data entered through a keyboard, a mouse or the like. The isochronous transfer mode is selected to ensure that a specific volume of data is transferred within a predetermined time length. The isochronous transfer mode may be selected to achieve real-time transfer of, for instance, dynamic image data, audio data or the like. The volume of data to be transferred within a predetermined length of time, as referred to in this context, indicates the substantial data transfer speed which may otherwise be referred to as the QoS. In this sense, the isochronous transfer mode can be regarded as an example of a transfer mode in which the QoS is assured (hereafter referred to as a quality assurance mode).

The isochronous transfer mode is now explained in further detail. In the isochronous transfer mode, it is ensured that a specific volume of data is transferred per unit time (micro frame). It is to be noted that the volume of data to be transferred is in proportion to the product of the data transfer speed and the length of transfer time. In order to assure the desired QoS, a specific number of time slots (MAS; media access slots) need to be secured within the micro frame.

For instance, under circumstances in which the execution of the link adaptation is bound to result in a lowered PHY rate, a greater length of transfer time may be secured to compensate for the lowered data transfer rate so as to assure the transfer data volume even after the execution of the link adaptation. Accordingly, if the execution of the link adaptation results in a lowered PHY rate, the specific transfer data volume can be sustained by securing a greater number of MASs within the micro frames so as to make up for the lowered PHY rate in the isochronous transfer mode. For instance, if the execution of the link adaptation results in the PHY rate being reduced to ½ of the initial rate, the number of MAS allocations secured within the micro frame should be doubled.

Some communication devices execute the link adaptation regardless of whether or not the PHY rate is to become lower. Such a communication device increases the MAS allocations after executing the link adaptation if the PHY rate is judged to have become lower. However, if the required number of MASs is difficult to be secured due to for instance, a scarcity of available slots in the micro frame, the desired level of QoS is difficult to be maintained with ease in the communication device. As a result, the state of communication at the communication device deteriorates compared to the pre-link adaptation state. Accordingly, there is a need for a control technology for maintaining the desired communication quality even after execution of the link adaptation.

The following is an explanation of the functional structure and the like of the communication device achieved in an embodiment of the present invention. The functional structure of the communication device includes a control technology for maintaining the pre-link adaptation communication quality after execution of the link adaptation.

Embodiment

The following is a detailed explanation of the communication device achieved in the embodiment of the present invention, given in reference to drawings. It is to be noted that the same reference numerals are assigned to identical components so as to preclude the necessity for a repeated explanation thereof.

(Structure of Communication Device 100)

First, the functional structure of the communication device achieved in the embodiment is explained in reference to FIG. 1. FIG. 1 is a block diagram of the functional structure adopted in the communication device in the embodiment.

The communication device 100 in the embodiment includes, as its principal components, an antenna 102, a communication unit 104, a QoS management unit 108, a CPU (Central Processing Unit) 110, a RAM (Random Access Memory) 112, a storage unit 115 and a ROM (Read Only Memory) 116. In addition, a communication management table 114 is held in the storage unit 115, which is connected via a bus 118 to other components in the communication device 100. Furthermore, the communication device 100 is capable of communicating with a peripheral device (A) 120 and a peripheral device (B) 122.

A high-frequency signal, for instance, can be transmitted through the antenna 102. In other words, a high frequency signal generated by the communication unit 104 can be transmitted to the peripheral device (A) 120 or the peripheral device (B) 122 via the antenna 102.

Figure 2:
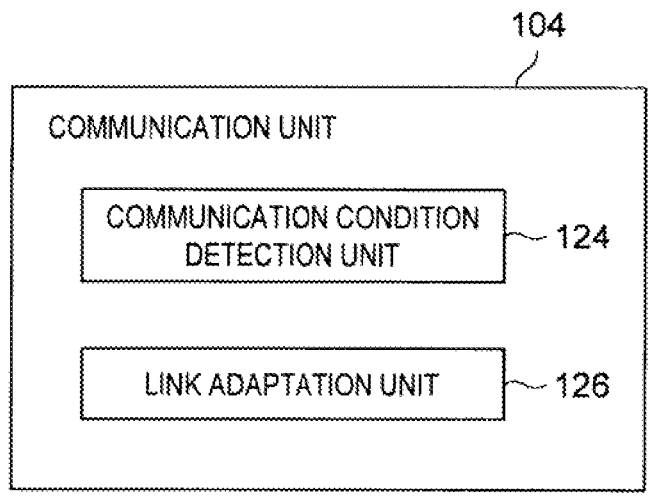
FIG. 2 is a block diagram showing the structure adopted in the communication unit in the embodiment.

As shown in FIG. 2, the communication unit 104 includes as its main components, a communication condition detection unit 124 and a link adaptation unit 126. The communication condition detection unit 124 detects an increase/decrease in the error rate by monitoring the communication conditions. The link adaptation unit 126 executes link adaptation based upon a link adaptation parameter set by the link adaptation control unit 106.

Figure 3:
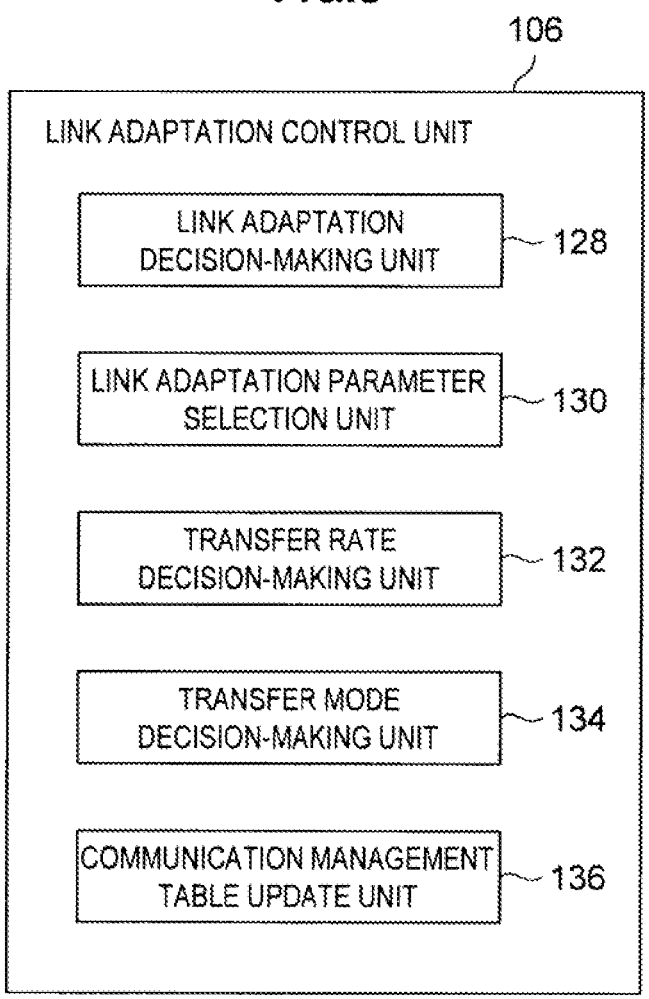
FIG. 3 is a block diagram showing the structure adopted in the link adaptation control unit in the embodiment.

As shown in FIG. 3, the link adaptation control unit 106 includes as its primary components, a link adaptation decision-making unit 128, a link adaptation parameter selection unit 130, a transfer rate decision-making unit 132, a transfer mode decision-making unit 134 and a communication management table update unit 136.

The link adaptation decision-making unit 128 makes a decision as to whether or not the link adaptation needs to be executed, in correspondence to the communication conditions detected by the communication condition detection unit 124. For instance, the link adaptation decision-making unit 128 may decide that the link adaptation needs to be executed if the error rate increases to exceed a predetermined transmission error rate and the corresponding communication conditions are reported by the communication condition detection unit 124. Alternatively, the link adaptation decision-making unit 128 may issue an inquiry with regard to the communication conditions to the communication condition detection unit 124 with predetermined time intervals and may make a decision as to whether or not the link adaptation needs to be executed based upon a response indicating the communication conditions received from the communication condition detection unit 124.

The link adaptation parameter selection unit 130 selects a link adaptation parameter to be used for the link adaptation when the link adaptation is judged to be necessary. Link adaptation parameters that may be used in link adaptation include, for instance, the PHY rate, the packet size, the modulation method and the transmission power level.

The link adaptation parameter selection unit 130 selects a parameter among the link adaptation parameters to be used when executing the link adaptation. The link adaptation parameter selection unit 130 may select specific values for the individual parameters in correspondence to the link adaptation parameters selected in combination. The link adaptation parameter selection unit 130 selects a single link adaptation parameter or a plurality of link adaptation parameters based upon a specific restricting condition imposed on the communication device 100. In addition, the link adaptation parameter selection unit 130 may alter the link adaptation parameter combination and the numerical values for the individual parameters as indicated in a user request.

The transfer rate decision-making unit 132 makes an advance decision by referencing the pre-link adaptation data transfer rate (PHY rate) written in the communication management table 114 to be detailed later as to whether or not the data transfer rate following the link adaptation executed based upon the link adaptation parameter selected by the link adaptation parameter selection unit 130 is to become lower compared to the pre-link adaptation state. Namely, the transfer rate decision-making unit 132 makes an advance decision as to whether or not the PHY rate is to become lower following the execution of the link adaptation so as to avoid as situation in which the required number of MASs is difficult to be secured following the execution of the link adaptation. In addition, the link adaptation control unit 106 may issue a link adaptation instruction to the link adaptation unit 126 if the transfer rate decision-making unit 132 determines that the PHY rate is not to become lower. The link adaptation unit 126 may forgo the link adaptation if the PHY rate is judged to become lower, regardless of whether or not enough MASs can be secured.

The transfer mode decision-making unit 134 makes a decision prior to execution of the link adaptation as to whether or not the currently selected data transfer mode is a quality assurance mode in which the communication quality (QoS) should be assured. This decision may be made by, for instance, judging whether a quality assurance mode such as the isochronous mode explained earlier is currently selected. As explained earlier, the volume of data transferred per unit time is maintained at a predetermined value or at a value equal to or greater than a predetermined value in the quality assurance mode. The transfer mode decision-making unit 134 is capable of making an advance decision as to whether or not it is necessary to assure the communication quality when the link adaptation decision-making unit determines that the link adaptation needs to be executed. If, the current transfer mode is judged to be a transfer mode in which assurance of the communication quality is not important, the link adaptation control unit 106 issues an instruction to the link adaptation unit 126 for execution of the link adaptation. Thus, the processing onus in execution of the link adaptation and the length of processing time used for the link adaptation can both be reduced.

The communication update table update unit 136 updates the communication management table 114 based upon the link adaptation parameter selected by the link adaptation parameter selection unit 130, if the transfer rate decision-making unit 132 determines that the data transfer rate is not to become lower following the execution of the link adaptation or if the number of time slots (MASs) allocated to the transfer data is adjusted by the communication quality management unit (QoS management unit 108) to be detailed later.

The following explanation is given in reference to FIG. 1. The QoS management unit 108 allocates a number of time slots large enough to maintain the communication quality, to the transfer data if the data transfer mode is judged to he the unit assurance mode by the transfer mode decision-making unit 134 and the data transfer rate is judged to become lower following the execution of the link adaptation by the transfer rate decision-making unit 132. It is to be noted that the QoS management unit 108 represents an example of the communication quality management unit. As described above, when the PHY rate is judged to become lower as a result of the execution of the link adaptation, the QoS management unit 108 increases the number of MASs allocated to the transfer data so as to maintain the volume of data transferred per unit time. For instance, if the PHY rate is to become lower to approximately 1/N, the QoS management, unit 108 increases the number of MAS allocations to be secured in the micro frame by a factor of at least N (N is a natural number). If the PHY rate is expected to become lower by ½, the QoS management unit 108 increases the number of MAS allocations within a single micro frame by a factor oft at least 2. In addition to the function of securing MASs, the QoS management unit 108 may have a function of making a decision as to whether or not MASs can be secured immediately.

The CPU 110 executes a program in conformance to which the various units in the communication device 100 are controlled. While FIG. 1 shows the link adaptation control unit 106 and the QoS management unit 108 as entities separate from the CPU 110, the CPU 110 may also fulfill the function of the link adaptation control unit 106 or the QoS management unit 108 based upon a specific program. While the CPU 110 also functioning as the link adaptation control unit 106 or the QoS management unit 108 needs to have a level of processing capability high enough to handle the processing onus of taking on the extra functions, advantages such as a reduction in the overall production costs of the communication device 100 and a reduction in the power consumption can be achieved.

The RAM 12 functions as a buffer where data used by the CPU 110 to achieve the functions of the various units, for instance, are temporarily stored. In the ROM 116, which is a read-only memory, a program that enables the CPU 110 to realize the functions of the various units, for instance, is stored.

The storage unit 115 holds the communication management table 114 containing the link adaptation parameters. In addition, the storage unit 115 is connected with various units so that it can be accessed primarily from the communication unit 104, the link adaptation control unit 106 or the QoS management unit 108. The storage unit 115 is constituted with any of various types of storage means including a magnetic storage device such as a hard disk drive, an optical storage device, a magneto-optical storage device and a semiconductor memory. It is to be noted that the communication management table 114 may be held in the RAM 112 or another storage means.

The communication management table 114 is referenced by the link adaptation unit 126 when the link adaptation unit 126 executes the link adaptation. The link adaptation unit 126 may execute the link adaptation based upon the link adaptation parameters contained in the communication management table 114. In addition, the communication management table 114 is referenced by the transfer rate decision-making unit 132 when it compares the PHY rates before and after the execution of the link adaptation. The communication management table 114 holds recorded therein the pre-link adaptation PHY rate at the time of the PHY rate comparison so as to allow the transfer rate decision-making unit 132 to reference the pre-link adaptation PHY rate recorded in the communication management table 114. The communication management tablet 4 is also referenced by the transfer mode decision-making unit 134 prior to the execution of the link adaptation to make a decision as to whether or not the quality assurance mode is currently selected.

(Structure of Communication Management Table 114)

Now, in reference to FIG. 4, the structure of the communication management table 114 is explained. FIG. 4 shows an example of a structure that may be adopted in the communication management table 114. The numerical values entered in the diagram represent an example and specific optimal values should be set in correspondence to, for instance, the operating environment.

In the communication management table 114, the pipe, the number of MAS allocations, the link adaptation parameters, the operating conditions and the like are written in correlation to one another, in correspondence to each device with which the communication device 100 is capable of communicating.

FIG. 4 presents an example of the communication management table 114 that may be prepared for the communication device 100, which is capable of communicating with the peripheral device (A) 120 and the peripheral device (B) 122. In the "partner device field" in the sixth column, A is entered in each row related to the state of communication between the communication device 100 and the peripheral device (A) 120 and B is entered in each row related to the state of communication between the communication device 100 and the peripheral device (B) 122.

It is to be noted that a single peripheral device is able to simultaneously execute a plurality of communications in the controlled transfer mode (or the bulk transfer mode). For instance, the peripheral device (A) 120 may simultaneously execute two bulk transfers. Under such circumstances, different link adaptation parameters may be used in the individual bulk transfers.

In the two upper rows in the "pipe" field, "controlled transfer" is entered for both the peripheral device (A) 120 and the peripheral device (B) 122. In addition, in the two lower rows in the "pipe" field, "bulk transfer" is indicated as the transfer mode for the peripheral device (A) 120 and "isochronous transfer" is indicated as the transfer mode set in correspondence to the peripheral device (B) 122. Also, by referencing the "operating conditions" field at the right end, the current operating conditions can be ascertained. Thus the transfer mode decision-making unit 134 is able to make a decision as to whether or not the isochronous transfer mode is currently selected by referencing the "pipe" field and the "operating conditions" field in the communication management table 114.

The "link adaptation parameters" field includes fields "PHY rate", "packet size" and "transmission power level". The PHY rates corresponding to the individual peripheral devices and the individual pipes are entered in the "PHY rate" field. Transmission packet capacities are entered in the "packet size" field and transmission power levels are entered in the "transmission power level" field. Although not indicated in the FIG., the "link adaptation parameters" field may further include a "modulation method" field in the like. In such a field, parameters including, for instance, ASK (amplitude shift keying), PSK (phrase shift keying) FSK (frequency shift keying), QPSK (quadrature PSK), BPSK (binary PSK), APSK (amplitude PSK) and QAM (quadrature amplitude modulation) may be indicated as parameter settings.

(Utilization Mode for Communication Management Table 114)

Figure 5:
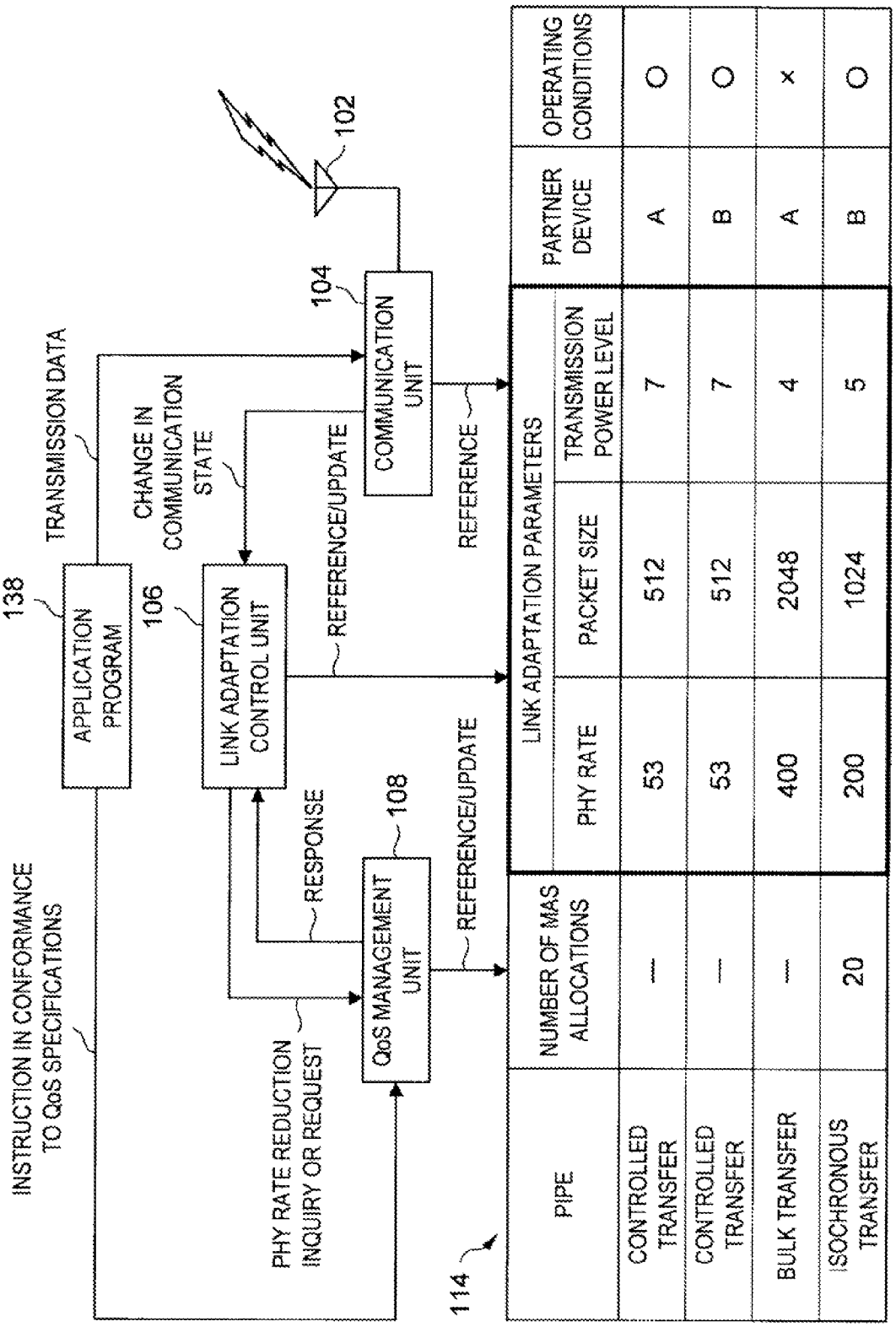
FIG. 5 shows in detail the link adaptation processing executed in the embodiment.

Next, in reference to FIG. 5, a specific mode of utilization of the communication management table 114 is explained. FIG. 5 illustrates the process through which the communication device 100 references or updates the communication management table 114.

An example of a method that may be adopted when setting the link adaptation parameters used in the execution of the link adaptation by utilizing the communication management table 114 is first explained. It is to be noted that various parameter settings including the link adaptation parameter settings may be stored in the form of individual sets of data, instead of data in a table format, in a removable storage medium or the like.

An application program 138 shown in FIG. 5 is briefly described. The application program 138 is a software program used by the user via the communication device 100 or an operation terminal connected to the communication device 100. Software programs that address the need for maintaining the QoS include, for instance, software programs for image or audio streaming reproduction and real-time communication software programs for IP (Internet protocol) telephones or the like. The application program 138 requests that a factor of foremost importance in assuring that the communication quality be maintained at a specific level, e.g., that the communication speed be maintained at a level equal to or greater than 5 Mbps. Accordingly, the link adaptation parameter selection unit 130 selects a link adaptation parameters with a communication quality requested by the application program 138 designated as a restricting condition.

Now, in reference to FIG. 5, the specific process through which the link adaptation is executed is explained.

First, the link adaptation control unit 106 transmits a "communication condition verification message" to the communication unit 104. Upon receiving the "communication condition verification message" from the link adaptation control unit 106, the communication unit 104 verifies the communication conditions. Then, the communication unit 104 transmits "communication condition information" to the link adaptation control unit 106.

The link adaptation control unit 106 receives the "communication condition information" from the communication unit 104. Then, based upon the "communication condition information" received from the communication unit 104, the link adaptation control unit 106 makes a decision as to whether or not the link adaptation needs to be executed. If the link adaptation is judged to be necessary, the link adaptation control unit 106 determines a specific combination of link adaptation parameters to be adjusted in preparation for the link adaptation. The link adaptation parameters are control parameters based upon which the communication unit 104 is controlled and include information indicating, for instance, the PHY rate, the packet size and the transmission power level.

The link adaptation control unit 106 makes a decision as to whether or not the PHY rate is to become lower as a result of the execution of the link adaptation by referencing the communication management table 114 and comparing the required PHY rate for the adjustment of the link adaptation parameters having been selected with the PHY rate recorded in the communication management table 114. The PHY rate recorded in the communication management table 114 indicates the value of the PHY rate set ting currently selected for the communication unit 104. If it is judged that, the PHY rate is not to become lower, the link adaptation control unit 106 records the selected link adaptation parameters into the communication management table 114. If, on the other hand, it is decided that the PHY rate is to become lower, the link adaptation control unit 106 transmits a "PHY rate change inquiry message" to the QoS management unit 108.

The QoS management unit 108 receives the "PHY rate change inquiry message" from the link adaptation control unit 106. In response to the "PHY rate change inquiry message" received from the link adaptation control unit 106, the QoS management unit 108 makes a decision as to whether or not the PHY rate can be altered. If it is decided that the PHY rate can be altered, the QoS management unit 108 transmits a "PHY rate change OK response" to the link adaptation control unit 106. If, on the other hand, it is decided that the PHY rate is difficult to be altered, the QoS management unit 108 transmits a "PHY rate change NG response" to the link adaptation control unit 106.

The link adaptation control unit 106, having received the "PHY rate change OK response" from the QoS management unit 108, records the selected PHY rate into the communication management table 114. Once the selected PHY rate is recorded, the link adaptation control unit 106 transmits a "PHY rate reduction request message" to the QoS management unit 108 to request that the PHY rate be reduced.

Upon receiving the "PHY rate change NG response" from the QoS management unit 108, the link adaptation control unit 106 executes a search for another combination of link adaptation parameters that will enable execution of the link adaptation without having to change the PHY rate. If there is such an alternative combination of link adaptation parameters, which will enable execution of the link adaptation without necessitating a change in the PHY rate, the link adaptation control unit 106 designates the link adaptation parameters in this combination as new link adaptation parameters.

Upon receiving the "PHY rate reduction request message" from the link adaptation control unit 106, the QoS management unit 108 makes a decision as to whether or not the PHY rate can be immediately reduced. If there are no available MASs that can be secured and it is therefore decided that the PHY rate is difficult to be reduced immediately, the QoS management unit 108 transmits a "PHY rate reduction rejection response" to the link adaptation control unit 106. If on the other hand, it is decided that the PHY rate can be reduced immediately, the QoS management unit 108 adjusts the MAS allocations as required to reduce the PHY rate. Upon completing the adjustment of the MAS allocations, the QoS management unit 108 transmits a "PHY rate reduction preparation completion response" to the link adaptation control unit 106.

Upon receiving the "PHY rate reduction preparation completion response" from the QoS management unit 108, the link adaptation control unit 106 records the new (lower) PHY rate into the communication management table 14. If, on the other hand, the "PHY rate reduction rejection response" is received from the QoS management unit 108 or no response from the QoS management unit 108 is received within a predetermined length of time, the link adaptation control unit 106 again makes a decision as to whether or not the link adaptation needs to be executed after waiting in standby over a predetermined length of time.

The communication unit 104 executes transmission control based upon the link adaptation parameters recorded in the communication management table 114 and the number of MAS allocations by referencing the communication management table 114 set up for the data transfer. Thus, under circumstances such as those in which the required number of MASs is difficult to be secured and the communication quality following the execution of the link adaptation is bound to become poorer as a result, the communication device 100 is able to take optimal measures, e.g., execute the link adaptation through another link adaptation method, which will not lower the communication quality or suspend the link adaptation for the time being so as to maintain the current state.

The link adaptation method achieved in the preferred embodiment has been explained above by bearing in mind the flow of data exchanged among the individual components of the communication device 100. The following is a more detailed explanation of the link adaptation processes, given in reference to flowcharts, achieved by adopting the link adaptation method in the embodiment and the link adaptation method achieved in a variation. It is to be noted that the present invention may be adopted in a link adaptation method other than those explained in reference to the embodiment and the variation.

(First Link Adaptation Method)

Figure 6:
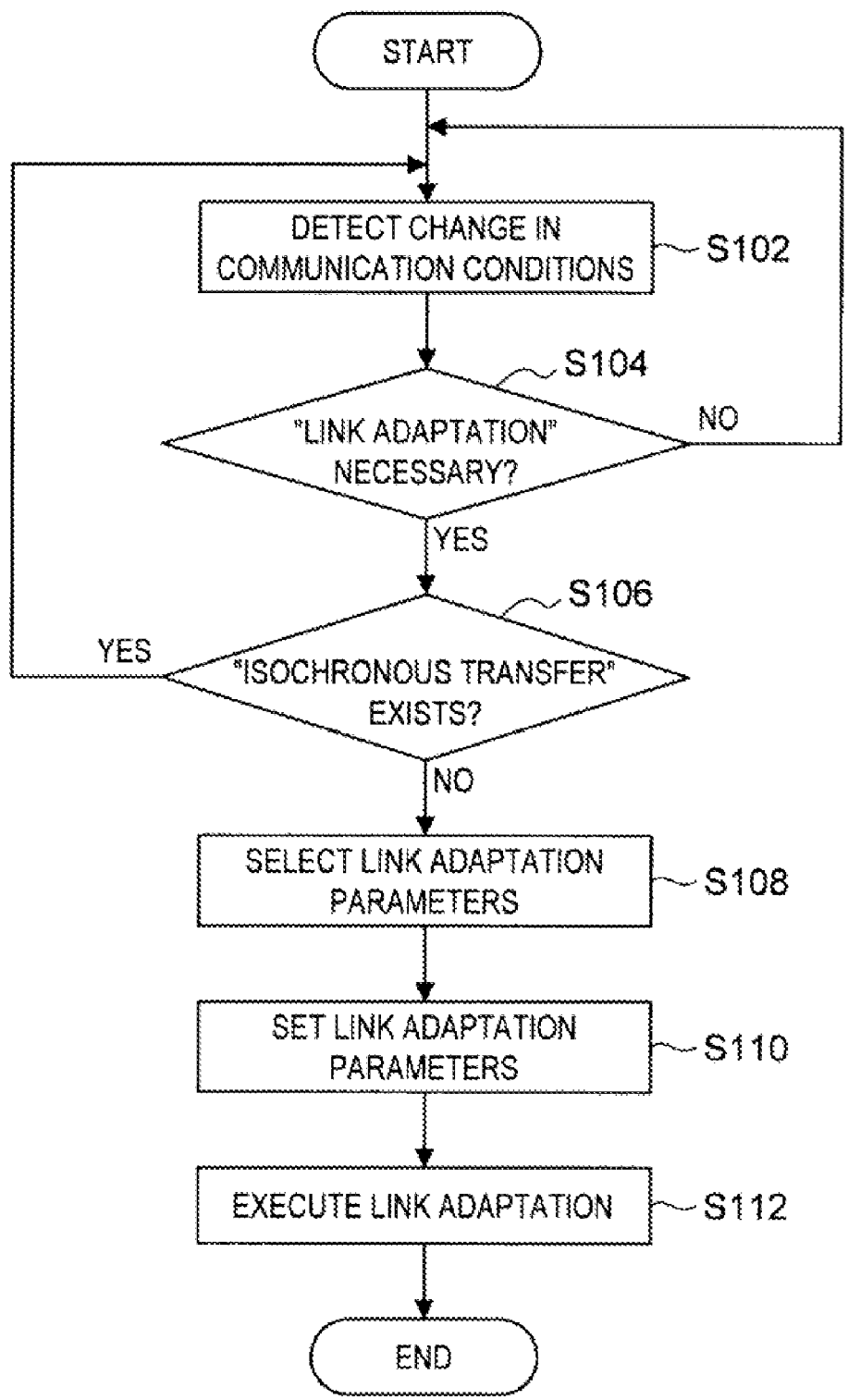
FIG. 6 presents a flowchart of the link adaptation processing executed in the embodiment.

First, a first link adaptation method is explained in reference to the flowchart presented in FIG. 6. In the first link adaptation method, a decision as to whether or not a transfer mode requiring assurance of the communication quality; is currently on, is made before execution of the link adaptation. Then, if it is judged that the communication quality should be assured, reduction in the communication quality attributable to the link adaptation is prevented.

First, the communication condition detection unit 124 detects any change in the communication conditions (S102). This detection processing may be executed regularly with predetermined time intervals or it may be executed constantly so as to monitor the communication conditions at all times. Subsequently, based upon the information on the communication conditions obtained from the communication condition detection unit 124, the link adaptation decision-making unit 128 makes a decision as to whether or not the link adaptation needs to be executed (S104). If it is decided that the link adaptation does not need to be executed, the communication device 100 does not execute the link adaptation.

However, if it is decided that the link adaptation is necessary the transfer mode decision-making unit 134 references the communication management table 114 and makes a decision as to whether or not the pipes currently in use includes the isochronous transfer (S106). If it is decided that the isochronous transfer is included, the communication device 100 does not execute the link adaptation. Then, after waiting in standby over a predetermined length of time, the communication device 100 re-executes the communication condition detection step.

If, on the other hand, it is decided that the pipes currently in use include the isochronous transfer, the link adaptation parameter selection unit 130 selects the link adaptation parameters optimal for the link adaptation (S108). The link adaptation parameters may be calculated as expressed in specific computation expressions based upon measurement values such as the SNR (signal-to-noise ratio), the BER (bit error rate) or the PER (packet error rate), or they may be selected by referencing a link adaptation parameter correspondence table indicating specific link adaptation parameters in correspondence to a single combination of the measurement values or in correspondence to a plurality of combinations of the measurement values. In such a correspondence table, optimal combinations of the link adaptation parameters having been ascertained through experience or having been obtained by conducting advance tests are indicated. Alternatively, the correspondence table may indicate combinations of numerical values calculated as expressed in the specific computation expressions.

After the optimal link adaptation parameters are selected as described above, the communication device 100 sets the selected link adaptation parameters as new link adaptation parameters (S110). At this time, the communication management table update unit 136 writes the new link adaptation parameters into the communication management table 114.

The link adaptation unit 126 then executes the link adaptation based upon the new link adaptation parameters having been set as described above (S112).

As described above, the communication device 100 is able to make a decision as to whether or not the pipes currently in use include the isochronous transfer requiring assurance of the communication quality, prior to the actual execution of the link adaptation. Thus, when the communication quality assurance is required, the communication device 100 is able to preempt any reduction in the communication quality attributable to the link adaptation.

(Second Link Adaptation Method)

Next, in reference to the flowchart presented in FIG. 7, a second link adaptation method is explained. It is to be noted that a repeated explanation of processing identical to that in the first link adaptation method is omitted and that the differences between the first link adaptation method and the second link adaptation method alone are described in detail in the following explanation.

The communication condition detection unit 124 detects any change in the communication conditions by monitoring changes in the error rate and the like (S202). Based upon the communication conditions detected by the communication condition detection unit 124, the link adaptation decision-making unit 128 makes a decision as to whether or not the link adaptation needs to be executed (S204). If the link adaptation is determined to be unnecessary, the communication device 100 waits in standby, for a predetermined length of time and then detects any change in the communication conditions again. If, on the other hand, the link adaptation is judged to be necessary, the link adaptation parameter selection unit 130 selects the link adaptation parameters (S206).

The transfer rate decision-making unit 132 makes a decision as to whether or not the PHY rate is to become lower following the execution of the link adaptation (S208). If it is decided that the PHY rate is not to become lower after executing the link adaptation based upon the link adaptation parameters selected by the link adaptation parameter selection unit, the communication device 100 sets the selected link adaptation parameters as new link adaptation parameters (S220). Then, the link adaptation unit 126 executes the link adaptation based upon the new link adaptation parameters (S222).

If on the other hand, the PHY rate is judged to become lower after the execution of the link adaptation, the transfer mode decision-making unit 134 makes a decision as to whether or not the currently selected transfer mode includes the isochronous transfer mode necessitating the communication quality to be maintained (S210). The transfer mode decision-making unit 134 in the communication device 100, with the communication management table 114 held therein, references the communication management table 114 to ascertain the transfer modes that are engaged prior to the link adaptation and makes a decision as to whether or not the transfer modes engaged in the pre-link adaptation state include the isochronous transfer mode.

If the currently engaged transfer modes do not include the isochronous transfer mode, the communication device 100 sets the link adaptation parameters selected by the link adaptation parameter selection unit 130 as new link adaptation parameters (S220). Then, the link adaptation unit 126 executes the link adaptation based upon the new link adaptation parameters (S222).

If, on the other hand, the currently engaged transfer modes include the isochronous transfer mode, the link adaptation control unit 106 transmits a message inquiring whether or not the PHY rate can be altered to the QoS management unit 108 (S211). Upon receiving the inquiry message, the QoS management unit 108 makes a decision as to whether or not the required number of MASs can be secured immediately (S212). If the required number of MASs can be secured immediately at this point in time, the QoS management unit 108 first secures the required number of MASs and then transmits a response message indicating that the link adaptation is possible to the link adaptation control unit 106. Upon receiving the response message, the link adaptation control unit 106 sets the link adaptation parameters selected by the link adaptation parameter selection unit 130 as the new link adaptation parameters (S220). Then, the link adaptation unit 126 executes the link adaptation based upon the new link adaptation parameters (S222).

If, on the other hand, it is decided that the required number of MASs are difficult to be secured immediately, the QoS management unit 108 transmits a response message indicating that the required number of MASs are difficult to be secured immediately to the link adaptation control unit 106. Upon receiving the response message, the link adaptation control unit 106 looks for alternative link adaptation parameters that will enable execution of the link adaptation while maintaining the PHY rate (S214). If such link adaptation parameters are found, the link adaptation parameter selection unit 130 selects the alternative link adaptation parameters (S216). Subsequently, the link adaptation control unit 106 sets the alternative link adaptation parameters as the new link adaptation parameters (S220). Then, the link adaptation unit 126 executes the link adaptation based upon the new link adaptation parameters (S222).

If there are no alternative link adaptation parameters, the link adaptation control unit 106 transmits a "PHY rate reduction request"), instructing that MAS allocations be secured in the quantity matching the extent of the reduction in the PHY rate, to the QoS management unit 108 while allowing for a delay (S217). The link adaptation control unit 106 then waits for a response from the QoS management unit 108 and makes a decision as to whether or not the required number of MASs has been secured within a predetermined length of time (S218).

If no response from the QoS management unit 108 is returned within the predetermined length of time and thus the required number of MASs is not secured the communication device 100 waits in standby over a predetermined length of time and then re-executes the processing related to the link adaptation execution starting in step (S202) for the communication condition detection. If, on the other hand, the required number of MASs is secured within the predetermined length of time, the QoS management unit 108 transmits a message indicating that the required number of MASs has been secured to the link adaptation control unit 106. Subsequently, the link adaptation control unit 106 sets the link adaptation parameters selected by the link adaptation parameter selection unit 130 as the new link adaptation parameters (S220). Then, the link adaptation unit 126 executes the link adaptation based upon the new link adaptation parameters (S222).

As explained above, a decision as to whether or not the PHY rate is to change after executing the link adaptation is made and also a decision as to whether or not the transfer mode requiring the communication quality to be maintained is currently selected is made in the second link adaptation method. In addition, a decision is made as to whether or not the link adaptation can be executed is made and the link adaptation parameters are selected in correspondence to the MAS acquisition status. As a result, when the communication quality does not need to be maintained, the link adaptation can be executed immediately. If, on the other hand, the communication quality should be maintained, the link adaptation is executed if the required number of MASs is secured with a high level of reliability. Consequently, the link adaptation can be executed quickly and, at the same time, reliable communication quality management is assured.

It should be understood by those skilled in the art that various modifications combinations, sub-combinations and alterations may occur depending on design requirements and other factors insofar as they are within the scope of the appended claims or the equivalents thereof.

What is claimed is:

1. A communication device capable of transferring time-division data and also capable of executing link adaptation for adjusting a communication method in correspondence to communication conditions with regard to communication with other communication devices, comprising:

a communication condition detection unit that detects the communication conditions;

a link adaptation decision-making unit that makes a decision as to whether or not the link adaptation needs to be executed based upon the communication conditions;

a link adaptation parameter selection unit that selects a link adaptation parameter to be used for the link adaptation if the link adaptation is judged to be necessary;

a storage unit that holds a communication management table containing setting information with regard to at least a data transfer rate to be used as a link adaptation parameter;

a transfer rate decision-making unit that makes an advance decision by referencing a pre-link adaptation data transfer rate recorded in the communication management table as to whether or not the data transfer rate is to become lower compared to a pre-link adaptation state if the link adaptation is executed based upon the selected link adaptation parameter, and if the data transfer rate is judged to become lower, the link adaptation is forgone;

a transfer mode decision-making unit that makes a decision prior to execution of the link adaptation as to whether or not a currently selected data transfer mode includes a quality assurance mode in which communication quality needs to be assured;

a communication quality management unit that allocates a large enough number of time slots to sustain the communication quality to transfer data if the data transfer mode is judged to include the quality assurance mode and the data transfer rate is judged to become lower after the execution of the link adaptation;

a communication management table update unit that updates the communication management table based upon the link adaptation parameter selected by the link adaptation parameter selection unit if the data transfer rate is judged not to become lower after the execution of the link adaptation or the communication quality management unit adjusts the number of time slots allocated to the data transfer; and a link adaptation unit that executes the link adaptation based upon the link adaptation parameter having been recorded in the communication management table.

2. A communication device capable of executing link adaptation for adjusting a communication method in correspondence to communication conditions with regard to communication with other communication devices, comprising:

a CPU (Central Processing Unit);

a RAM (Random Access Memory);

a communication condition detection unit that detects the communication conditions with regard to communication with the other communication device;

a link adaptation decision-making unit that makes a decision as to whether or not the link adaptation needs to be executed based upon the communication conditions;

a link adaptation parameter selection unit that selects a link adaptation parameter to be used for the link adaptation if the link adaptation is judged to be necessary;

a transfer rate decision-making unit that makes an advance decision as to whether or not a data transfer rate is to become lower compared to a pre-link adaptation state if the link adaptation is executed based upon the link adaptation parameter selected by the link adaptation parameter selection unit, and if the data transfer rate is judged to become lower, the link adaptation is forgone;

a transfer mode decision-making unit that makes a decision prior to execution of the link adaptation as to whether or not currently selected data transfer modes include a quality assurance mode in which communication quality needs to be assured; and a link adaptation unit that executes the link adaptation by using the link adaptation parameter selected by the link adaptation parameter selection unit if the currently selected data transfer modes are judged to include the quality assurance mode and the data transfer rate is judged not to become lower.

3. A communication device according to claim 2, further includes a storage unit having recorded therein a communication management table containing setting information based upon which at least a data transfer rate to be used as a link adaptation parameter is set; and a communication management table update unit that updates the link adaptation parameters contained in the communication management table, wherein:

the transfer rate decision-making unit makes a decision by referencing the pre-link adaptation, which is recorded in the communication management table, as to whether or not the data transfer rate is to become lower after the execution of the link adaptation;

the communication management table update unit records the selected link adaptation parameter selected by the link adaptation parameter selection unit into the communication management table if the data transfer rate is judged not to become lower after the execution of the link adaptation; and the link adaptation unit executes the link adaptation based upon the link adaptation parameter having been recorded in the communication management table.

4. A communication device capable of transferring time-division data and also capable of executing link adaptation for adjusting a communication method in correspondence to communication conditions with regard to communication with other communication devices, comprising:

a communication condition detection unit that detects the communication conditions;

a storage unit that holds a communication management table containing setting information with regard to at least a data transfer rate to be used as a link adaptation parameter;

a transfer rate decision-making unit that makes an advance decision by referencing a pre-link adaptation data transfer rate recorded in the communication management table as to whether or not the data transfer rate is to become lower compared to a pre-link adaptation state if the link adaptation is executed based upon the selected link adaptation parameter, and if the data transfer rate is judged to become lower, the link adaptation is forgone;

a transfer mode decision-making unit that makes a decision prior to execution of the link adaptation as to whether or not currently selected data transfer modes include a quality assurance mode in which communication quality should be assured;

a link adaptation decision-making unit that makes a decision as to whether or not the link adaptation needs to be executed based upon the communication conditions;

a link adaptation parameter selection unit that selects a link adaptation parameter to be used for the link adaptation if the link adaptation is judged to be necessary; and a link adaptation unit that executes the link adaptation based upon the link adaptation parameter selected by the link adaptation parameter selection unit if the currently selected data transfer modes do not include the quality assurance mode.

5. A communication device capable of transferring time-division data and also capable of executing link adaptation for adjusting a communication method in correspondence to communication conditions with regard to communication with other communication devices, comprising:
- a communication condition detection unit that detects the communication conditions;
- a CPU (Central Processing Unit);
- a RAM (Random Access Memory);
- a link adaptation decision-making unit that makes a decision as to whether or not the link adaptation needs to be executed based upon the communication conditions;
- a link adaptation parameter selection unit that selects a link adaptation parameter to be used for the link adaptation if the link adaptation is judged to be necessary;
- a transfer rate decision-making unit that makes an advance decision as to whether or not a data transfer rate is to become lower compared to a pre-link adaptation state if the link adaptation is executed based upon the link adaptation parameter selected by the link adaptation parameter selection unit, and if the data transfer rate is judged to become lower, the link adaptation is forgone;
- a transfer mode decision-making unit that makes a decision prior to execution of the link adaptation as to whether or not a currently selected data transfer mode includes a quality assurance mode in which communication quality needs to be assured;
- a communication quality management unit that allocates a large enough number of time slots to sustain the communication quality to transfer data if the data transfer mode is judged to include the quality assurance mode and the data transfer rate is judged to become lower after the execution of the link adaptation; and
- a link adaptation unit that executes the link adaptation by using the link adaptation parameter selected by the link adaptation parameter selection unit after the number of allocated time slots is adjusted.

6. A communication method that enables a time-division data transfer and also enables execution of link adaptation for adjusting a communication method in correspondence to communication conditions with regard to communication with other communication devices, comprising:
- a communication condition detection step for detecting the communication conditions;
- a link adaptation decision-making step for making a decision based upon the communication conditions as to whether or not the link adaptation needs to be executed;
- a link adaptation parameter selection step for selecting a link adaptation parameter to be used for the link adaptation when the link adaptation is judged to be necessary;
- a transfer rate decision-making step for making an advance decision by referencing a communication management table having recorded therein a pre-link adaptation data transfer rate as to whether or not the data transfer rate is to become lower compared to a pre-link adaptation state if the link adaptation is executed based upon the link adaptation parameter selected in the link adaptation parameter selection step, and if the data transfer rate is judged to become lower, the link adaptation is forgone;
- a transfer mode decision-making step for making a decision prior to execution of the link adaptation as to whether or not a currently selected data transfer mode is a quality assurance mode in which communication quality should be assured;
- a communication quality management step for allocating a large enough number of time slots to maintain the communication quality to transfer data if the currently selected data transfer mode is judged to be the quality assurance mode and the data transfer rate is judged to become lower after the execution of the link adaptation;
- a communication management table update step for updating the communication management table based upon the link adaptation parameter selected by the link adaptation parameter selection step if the data transfer rate is judged not to become lower after the execution of the link adaptation or if the number of time slots allocated to the data transfer is adjusted in the communication quality management step; and
- a link adaptation step for executing the link adaptation based upon the link adaptation parameter having been recorded in the communication management table.

7. A communication device capable of transferring time-division data and also capable of executing link adaptation for adjusting a communication method in correspondence to communication conditions with regard to communication with other communication devices, comprising:
- a CPU (Central Processing Unit);
- a RAM (Random Access Memory);
- a communication condition detection unit that detects the communication conditions;
- a link adaptation decision-making unit that makes a decision as to whether or not the link adaptation needs to be executed based upon the communication conditions;
- a link adaptation parameter selection unit that selects a link adaptation parameter to be used for the link adaptation if the link adaptation is judged to be necessary;
- a transfer rate decision-making unit that makes an advance decision by referencing a pre-link adaptation data transfer rate as to whether or not a data transfer rate is to become lower compared to a pre-link adaptation state if the link adaptation is executed based upon the selected link adaptation parameter, and if the data transfer rate is judged to become lower, the link adaptation is forgone;
- a transfer mode decision-making unit that makes a decision prior to execution of the link adaptation as to whether or not a currently selected data transfer mode includes a quality assurance mode in which communication quality needs to be assured;
- a communication quality management unit that allocates a large enough number of time slots to sustain the communication quality to transfer data if the data transfer mode is judged to include the quality assurance mode; and
- a link adaptation unit that executes the link adaptation by using the selected link adaptation parameter after the number of allocated time slots has been changed.

8. A computer readable medium encoded with a computer program loadable into a memory of a computer and including software code portion that enables a computer to achieve communication functions with which a time-division data can be transferred and link adaptation for adjusting a transfer method in correspondence to communication conditions with regard to communication with other communication devices can be executed, allowing the computer to achieve:

a communication condition detection function for detecting the communication conditions;

a link adaptation decision-making function for making a decision based upon the communication conditions as to whether or not the link adaptation needs to be executed;

a link adaptation parameter selection function for selecting a link adaptation parameter to be used for the link adaptation when the link adaptation is judged to be necessary;

a transfer rate decision-making function for making an advance decision by referencing a communication management table having recorded therein a pre-link adaptation data transfer rate as to whether or not the data transfer rate is to become lower compared to a pre-link adaptation state if the link adaptation is executed based upon the link adaptation parameter selected through the link adaptation parameter section function, and if the data transfer rate is judged to become lower, the link adaptation is forgone;

a transfer mode decision-making function for making a decision prior to execution of the link adaptation as to whether or not a currently selected data transfer mode is a quality assurance mode in which communication quality should be assured;

a communication quality management function for allocating a large enough number of time slots to maintain the communication quality to transfer data if the currently selected data transfer mode is the quality assurance mode and the data transfer rate is judged to become lower after the execution of the link adaptation;

a communication management table update function for updating the communication management table based upon the link adaptation parameter selected through the link adaptation parameter selection function if the data transfer rate is judged not to become lower after the execution of the link adaptation or if the number of time slots allocated to the data transfer is adjusted through the communication quality management function; and a link adaptation function for executing the link adaptation based upon the link adaptation parameter having been recorded in the communication management table.

* * * * *